June 19, 1945.  S. H. VINNER  2,378,811
TAPER CUTTING ATTACHMENT TOOL
Filed Oct. 27, 1943  2 Sheets-Sheet 1
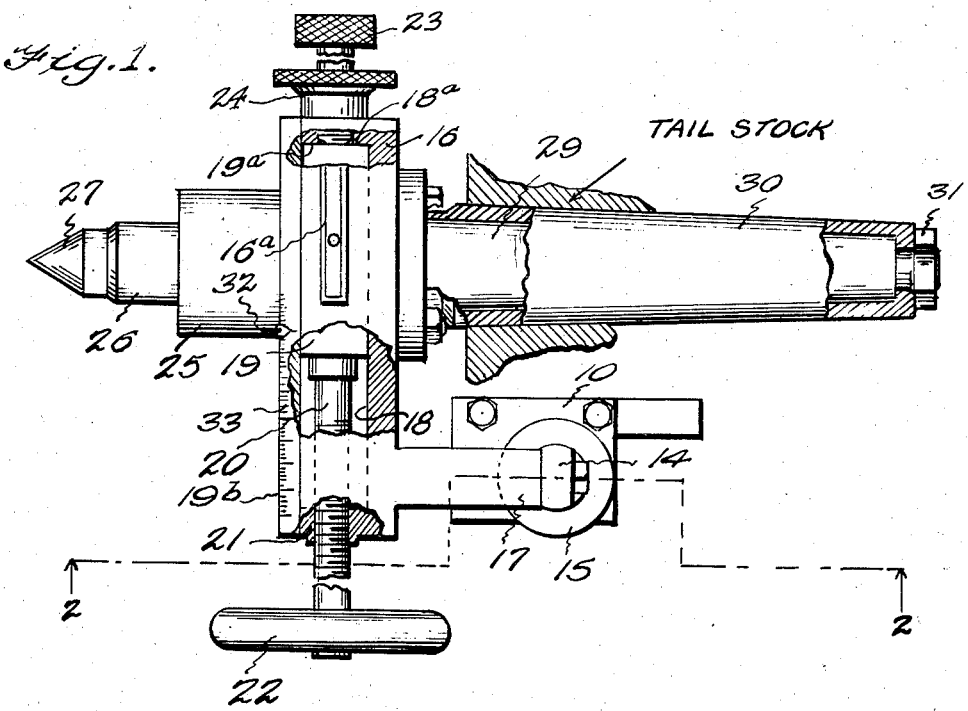
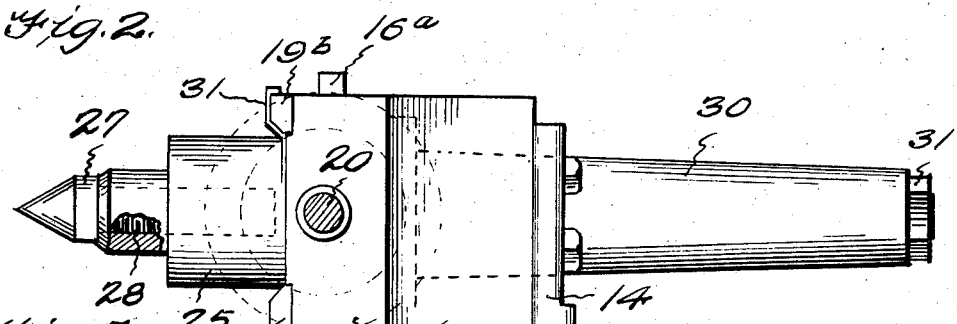
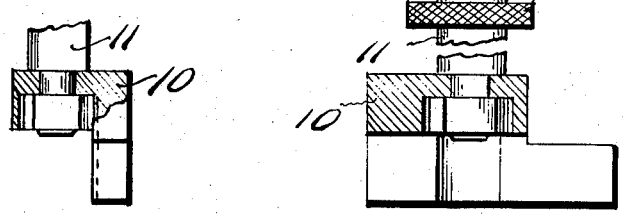
Inventor
SAMUEL H. VINNER
By
Attorney

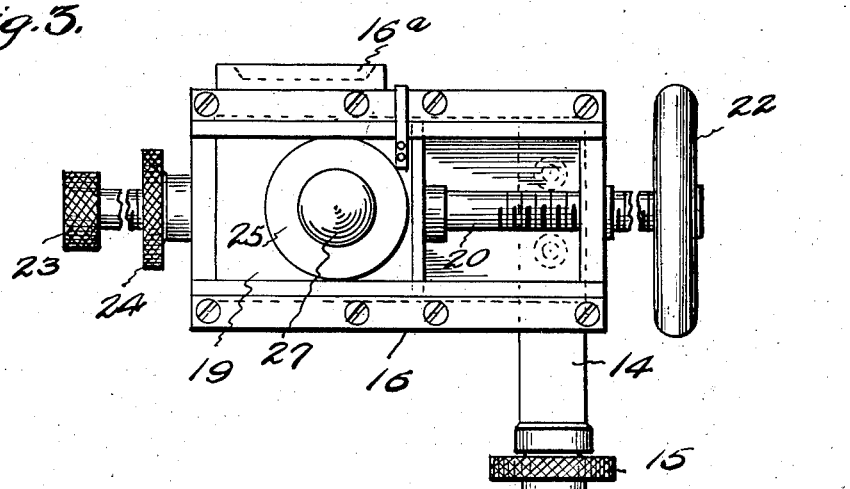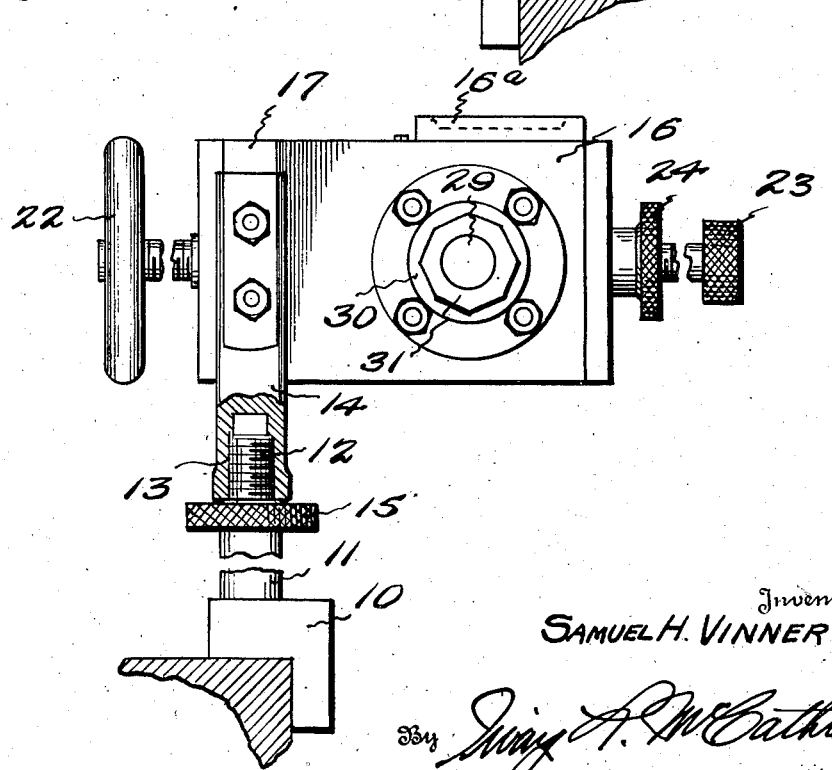

Patented June 19, 1945

2,378,811

UNITED STATES PATENT OFFICE 2,378,811

TAPER CUTTING ATTACHMENT TOOL

Samuel H. Vinner, Billings, Mont., assignor to John Irving Vinner, Billings, Mont.

Application October 27, 1943, Serial No. 507,847

4 Claims. (Cl. 82—33)

This invention relates to a taper cutting attachment tool and has for one of its objects the production of a simple and efficient tool which is adapted to be attached to the tail stock of a lathe and which may be easily adjusted to facilitate the cutting of a desired taper on the shaft which is being shaped.

A further object of this invention is the production of a taper cutting attachment tool which may be easily and quickly adjusted to the desired taper, and which does not require the adjustment of the tail stock after the tool is removed therefrom to assure proper alignment of the tail stock.

A still further object of this invention is the production of a simple and efficient means for facilitating the leveling of the taper cutting attachment tool after the tool has been attached to the tail stock.

Other objects and advantages of the present invention will appear throughout the following specification and claims.

In the drawings:

Figure 1 is a top plan view of the taper cutting attachment tool;

Figure 2 is a sectional view taken on line 2—2 of Figure 1, certain parts being shown in elevation;

Figure 3 is a front elevational view;

Figure 4 is a rear elevational view;

Figure 5 is an end elevational view of the base of the arm rest, certain parts being shown in section.

By referring to the drawings, it will be seen that 10 designates the base, which base 10 is adapted to rest on the bed of the lathe upon which the tool is to be mounted. A vertically extending swiveled post 11 is carried by the base 10 and is provided with a threaded upper end 12 which is threaded into the lower internally threaded end 13 of the supporting arm 14. The post 11 is adapted to be adjusted to raise or lower the tool to a level position and after such adjustment, the supporting arm 14 is locked in position by means of the lock nut 15.

A casing 16 is supported upon the arm 14, as shown, the arm 14 being connected to the rear end of the rearwardly extending rib 17, thereby supporting the casing 16 forwardly as well as laterally of the rib 17 and arm 14. The casing 16 is provided with a transverse cavity 18 in the front face thereof, and a transversely movable carriage 19 is movable therein transversely of the casing 16. This carriage 19 is connected to a rotatable threaded shaft 20, at one end thereof, which shaft 20 is threaded through the casing 20, as at 21. An adjustment wheel 22 is carried by the shaft 20. A lock bolt 23 is threaded through the opposite end of the casing 16 and is adapted to abut the adjoining end of the carriage 19 to lock the carriage 19 in a set position after the carriage 19 has been adjusted by the adjustment of the threaded shaft 20. A lock nut 24 is carried by the bolt 23 to lock the bolt in position after adjustment. The carriage 19 is provided with a projecting neck 25 having a reduced extension 26 into which is threaded the center tip 27, as at 28. This tip 27 is removable so that a new tip may be easily substituted. A female center may also be used if desired in place of the tip 27. The carriage 19 is held within the cavity 18 by means of removable track ships 19$^b$.

The casing 16 is carried by a solid tapering center stem 29 which projects rearwardly of and in line with the center tip 27, as shown in Figure 1. A revolving tapering sleeve 30 is carried by stem 29 and is held upon the stem 29 by a lock nut 31. The stem 29 and sleeve 30 are adapted to be clamped within the tail stock of a lathe and the stem 29 may rotate within the sleeve 30 as the supporting arm 14 is adjusted to bring the casing 16 in a level position.

In addition to the foregoing description, it should be noted that the sleeve 30 is held in the tail stock of a lathe in place of the ordinary dead center, and the base 10 is placed on the bed of the lathe. The post 11 is then adjusted to level the casing 16, a conventional level 16$^a$ being carried by the top of the casing 16 for this purpose, as shown in Figures 1 and 3. The carriage 19 is then adjusted for the desired taper of the shaft which is being shaped, the indicator 32 and scale 33 shown in Figure 1 being used for this purpose. The tail stock may be moved with the taper tool attached, if desired, so as to slide the same into the object to be cut, and there will be no danger of binding if the base 10, post 11, arm 14 and nut 15 are not locked in place until the tail stock has been so moved. When the end 19$^a$ of the carriage 19 abuts or is flush with the end 18$^a$ of the casing 16, the center point 27 is then in the exact center relative to the lathe. To cut an outside taper, the wheel 22 is rotated counter-clockwise, using indicator 31 and scale 32 to set the center point 27 for the desired taper. The bolts 23 is then set and locked by nut 24 to hold the carriage 19 in the adjusted position. In cutting a taper on a lathe, the tail stock is usually moved in order to offset the dead center, so as to cut the desired taper. After cutting the taper, the re-setting of the tail stock is a very tedious job, usually taking several hours, and even then many valuable pieces of work are ruined because the tail stock is just slightly offset. By means of my invention, however, the taper cutting attachment tool may be merely removed from the tail stock, after the desired taper is cut, without again moving the tail stock and the tail stock will therefore remain in a true line with the work.

It should be understood that certain detail changes may be made in the present invention so long as these changes fall within the following specification and claims.

Having described the invention, what is claimed as new is:

1. A tool of the class described comprising a casing, means for rotatably connecting said casing to the tail stock of a lathe, a center tip adjustable laterally relative to the casing, a base, and adjustable means engaging said base and casing for rotating said casing to render said casing level.

2. A tool of the class described comprising a casing, a carriage slidable transversely of the casing, a center tip carried by the casing, a loosely mounted sleeve carried by the casing and adapted to fit in the tail stock of a lathe, and adjustable means adapted to engage the bed of a lathe and to engage said casing for adjusting said casing to a level position.

3. A tool of the class described comprising a casing, a carriage slidable transversely of the casing, means for moving said carriage to a selected position transversely of the casing, means for locking the carriage in a selected position, means for rotatably supporting the casing, and means engaging said casing to one side of said last mentioned means and adapted to engage the bed of a lathe for rotating the casing to render the casing level.

4. A tool of the class described comprising a casing, a carriage slidable transversely of the casing, means for moving said carriage to a selected position transversely of the casing, means for locking the carriage in a selected position, means for rotatably supporting the casing, and base, and adjustable means engaging said base and said casing for rotating the casing to render the casing level, and an indicating means carried by the carriage and casing to indicate the position of said carriage relative to said casing.

SAMUEL H. VINNER.